2,283,854

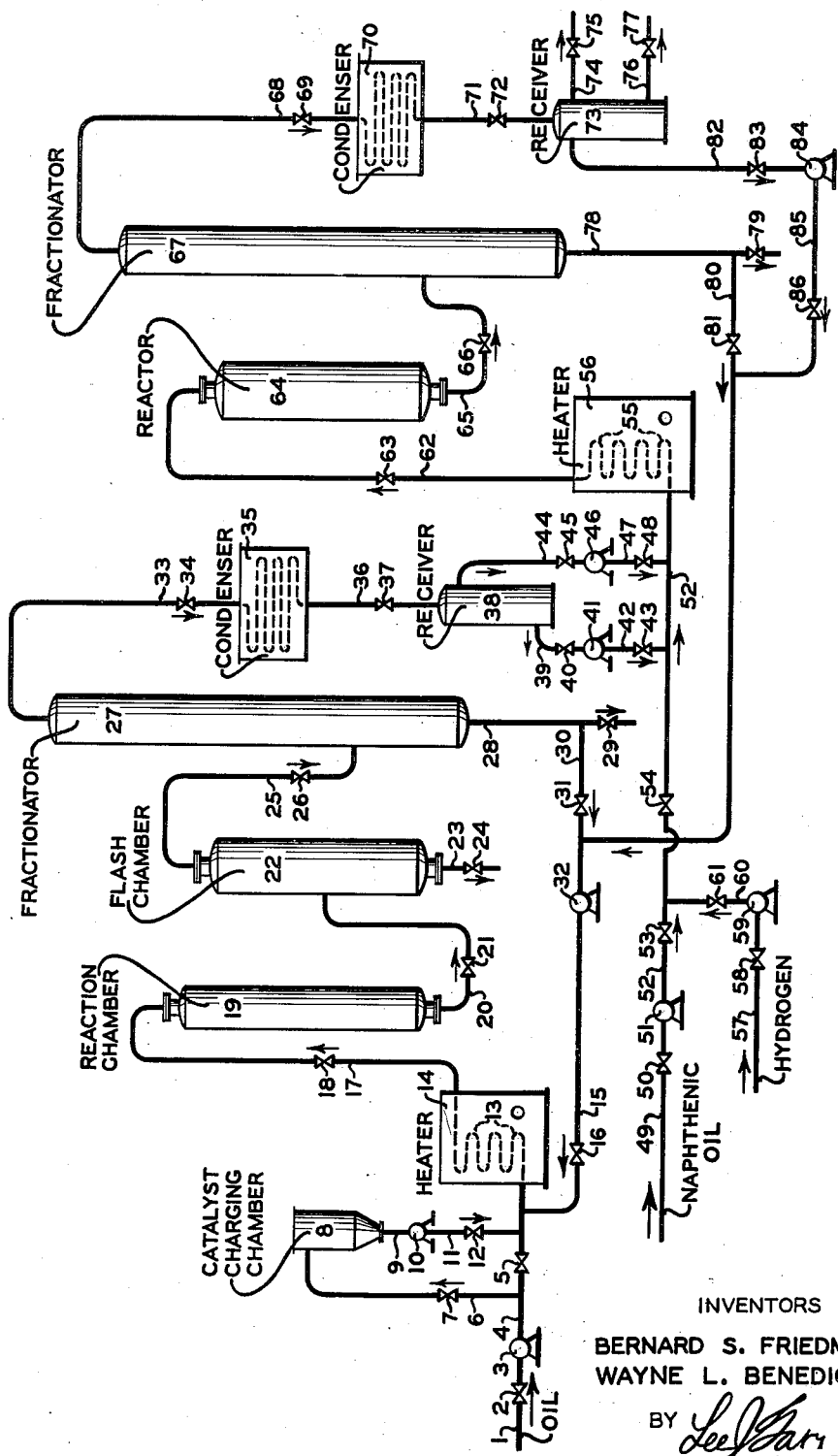
INVENTORS
BERNARD S. FRIEDMAN
WAYNE L. BENEDICT
BY Lee J. Car
ATTORNEY Patented May 19, 1942

UNITED STATES PATENT OFFICE 2,283,854

CONVERSION OF HYDROCARBON OILS

Bernard S. Friedman and Wayne L. Benedict, Chicago, Ill., assignors to Universal Oil Products Company, Chicago, Ill., a corporation of Delaware Application July 5, 1940, Serial No. 344,062

9 Claims. (Cl. 196—53)

This invention relates to the treatment of hydrocarbon oils containing substantially no gasoline to produce therefrom substantially saturated motor fuel of high antiknock value. The invention is concerned more particularly with the conversion of hydrocarbon oils in the presence of cracking and dehydrogenating catalysts and of a hydrogen-containing gas to produce substantially saturated hydrocarbon fractions suitable for use as fuel for automobile or airplane engines.

In one specific embodiment the present invention comprises a process for cracking a hydrocarbon oil in the presence of a selected powdered catalyst and of a hydrogen-containing gas at a temperature and pressure adequate to form a product containing a substantial proportion of motor fuel; separating said product into a hydrogen-containing gas, a motor fuel, and a higher boiling fraction; recycling a portion of said higher boiling fraction to further contact with said powdered cracking catalyst in the presence of said hydrogen-containing gas; mixing said motor fuel and a hydrogen-containing gaseous product of the process with an added naphthenic oil boiling above about 200° F. to form a commingled mixture; contacting said commingled mixture with a dehydrogenating catalyst under conditions of temperature and pressure adequate to form a substantially saturated product; separating said product into a hydrogen-containing gas, a substantially saturated gasoline fraction, and a higher boiling residue; recycling said hydrogen-containing gas and said higher boiling residue to commingle with the higher boiling fraction of the product from catalytic cracking being recycled to further contact with the mixture of charged oil and fresh cracking catalyst.

In the primary step of the process the powdered catalyst used to promote the desired conversion of the oil into a substantial yield of gasoline, containing some unsaturated hydrocarbons, is a natural or artificial material containing silica or siliceous and aluminous materials of more or less porous and refractory nature. The particular catalytic material selected will depend upon the nature of the oil charged and the extent of cracking desired. Untreated or acid-treated clays, fuller's earth, etc., with or without added difficultly reducible oxides are suitable as are likewise synthetically composited catalysts such as mixtures of hydrated silica and hydrated alumina which have been precipitated concurrently or separately and washed until substantially free from harmful impurities, then dried and calcined.

The preferred cracking catalysts comprise specially prepared synthetic materials such as silica-alumina, alumina-zirconia, and silica-alumina-zirconia which have relatively high activities for cracking a hydrocarbon oil. These catalytic composites may be prepared by admixing the precipitated components under conditions whereby alkali metal ions are excluded. Inasmuch as the chemistry of the solid state is at present developed incompletely, it has not been determined how these materials are arranged within the catalyst. In these catalysts the ratio of the components may be varied within wide limits and the masses may be considered to be comprised of intimate or possibly molecular admixtures, all of the components of which are more or less active individually but in the aggregate display high activity.

Motor fuel fractions formed by cracking of a hydrocarbon oil, such as gas oil, topped crude, or an oil from any source may generally contain unsaturated hydrocarbons as well as paraffins, naphthenes, and aromatics. By following the process of this invention further treatment of such motor fuel fractions containing unsaturated hydrocarbons with hydrogen and a naphthene-containing oil in the presence of a dehydrogenating catalyst may produce a substantially saturated motor fuel of improved antiknock value. While the reactions involved in such a treatment in the presence of a dehydrogenating catalyst are not understood clearly or completely, these may include dehydrogenation as of paraffins to olefins or of naphthenes to aromatics; isomerization of paraffins by migration of alkyl groups, and of olefins by shifting of double bonds and/or alkyl groups along the carbon chains; hydrogenation of unsaturated hydrocarbons; formation of aromatics through cyclization of paraffins, and/or olefins containing 6 or more carbon atoms in straight chain arrangement; and possible scission of carbon-to-carbon bonds in various types of hydrocarbons to produce other hydrocarbons of lower molecular weights and boiling ranges.

While any suitable type of dehydrogenating catalyst may be employed in the catalytic treating or reforming of olefin-containing gasoline in the presence of added naphthene-containing oils and of a hydrogen-containing gas, satisfactory catalytic material comprises a composite of a major proportion of a refractory carrier selected from such substances as alumina, magnesia, silica, activated clay, silica-alumina mixtures, silica-thoria mixtures, etc., and a relatively smaller proportion of an oxide of an element selected from the members of the left-hand columns of groups IV, V, and VI of the periodic table consisting of titanium, zirconium, cerium, hafnium, thorium, vanadium, columbium, tantalum, chromium, molybdenum, tungsten, and uranium. It is also comprised within the scope of this invention to employ combinations of two or more of the above indicated carriers and to support upon such carriers or carrier composites an activating oxide or any combination of oxides of the elements of the left-hand columns of groups IV, V, and VI of the periodic table.

The catalytic efficiencies of the above indicated carriers are improved greatly by the presence of compounds and more particularly oxides of the preferred elements in relatively minor amounts. These oxides which constitute the principal active catalytic materials may be deposited upon the surface and in the pores of the carrier granules by several alternative methods such as, for example, the ignition of nitrates which have been absorbed or deposited from aqueous solution by evaporation or by similar ignition of precipitated hydroxides. As an alternative method though sometimes less preferable, the finely divided oxides may be composited mechanically with the carrier granules either in the wet or in the dry condition. The point of achieving the most practical uniform ditsribution of the oxides on the carrier granules should be borne in mind constantly since the observed catalytic effects evidently depend principally on surface action.

The alternative catalysts prepared as hereinabove indicated may be pretreated by any necessary methods at elevated temperatures to increase their activities. In the heat treatment, gases such as air, steam, carbon dioxide, hydrogen, nitrogen, etc., may be passed over the catalyst. The general steps enumerated for the activation of catalytic materials may be employed also to effect reactivation after they have become coated with carbonaceous and tarry materials which may accumulate during a period of use.

The process may be illustrated further by reference to the attached diagrammatic drawing which shows a specific example of one form of apparatus which may be used for effecting the process. The broad scope of the invention should not be considered as limited by the particular apparatus illustrated.

Referring to the diagrammatic drawing, a hydrocarbon oil, if desired preheated by means not shown, may be admitted through line 1 and valve 2 to pump 3 which discharges through line 4 and valve 5. From line 4 a part or all of the oil may be directed through line 6 containing valve 7 into catalyst charging chamber 8 to which a powdered cracking catalyst suitable for the process is supplied continuously in desired proportions to form a slurry in the oil admitted to catalyst charging chamber 8. The slurry of oil and catalyst is directed from chamber 8 through line 9 to pump 10 which discharges the suspension of catalyst in oil through line 11 containing valve 12 to line 4 which leads to heating element 13. Charged oil leaving pump 3 and not directed to catalyst charging chamber 8 flows through valve 5 and thence in admixture with the catalyst suspension to heating element 13 located in a suitable heater 14. A partially converted oil from a subsequent step of the process which will be hereinafter described may also be admitted to the oil undergoing treatment in heating element 13 by way of line 15 containing valve 16. The mixture of catalyst suspension and hydrocarbons heated in element 13 is conducted thence through line 17 and valve 18 to reaction chamber 19 maintained at a temperature in the approximate range of 800–1200° F. and under a pressure of from substantially atmospheric to approximately 300 pounds per square inch but preferably of the order of 150 pounds per square inch to promote the formation of a substantial yield of hydrocarbons of motor fuel boiling range.

From reaction chamber 19 the resultant mixture may be conducted through line 20 containing pressure-reducing valve 21 to flash chamber 22 in which if desired the pressure may be reduced to substantially atmospheric in order to separate the hydrocarbon products as vapors from used cracking catalyst or from a mixture of used cracking catalyst in a relatively high boiling hydrocarbon oil or residue. The used cracking catalyst or mixture containing the same may be withdrawn from flash chamber 22 through line 23 and valve 24 to storage or to other use not shown. Hydrocarbon vapors separated in flash chamber 22 may be discharged therefrom as an overhead fraction through line 25 and valve 26 to fractionator 27 which may comprise a fractionating column of adequate design for separating a mixture of gaseous products and a cracked motor fuel fraction from a higher boiling residue. The higher boiling residue may be conducted from the bottom of fractionator 27 through line 28 and valve 29 to storage or to other use. If desired a portion of the residue being discharged through line 28 may be directed through line 30 containing valve 31 to pump 32 which discharges through line 15 and valve 16 to line 4, already mentioned, through which the mixture of charged oil and cracking catalyst is introduced to heating element 13.

The mixture of gaseous products and vaporous cracked motor fuel may be conducted from the top of fractionator 27 through line 33, valve 34, condenser 35, rundown line 36, and valve 37 to receiver 38 in which gaseous and liquid hydrocarbons may be collected. The liquid hydrocarbons may be withdrawn from near the bottom of receiver 38 through line 39 and valve 40 to pump 41 which discharges through line 42 and valve 43 into line 52 while the gaseous products may be withdrawn from near the top of receiver 38 through line 44 containing valve 45 to compressor 46 which discharges through line 47 and valve 48 to line 52 through which may be passed a mixture of hydrogen and an oil containing naphthenic hydrocarbons introduced as hereinafter set forth. If desired, the products passing through line 33 and valve 34 may be conducted thence to line 52, by means not shown in the diagrammatic drawing. The oil containing naphthenic hydrocarbons may be admitted from an outside source through line 49 and valve 50 to pump 51 which discharges through line 52 and valves 53 and 54 to heating element 55 which receives heat from furnace 56. If desired the oil containing naphthenic hydrocarbons may be commingled in line 52 with hydrogen or a hydrogen-containing gas introduced from an outside source through line 57 and valve 58 to compressor 59 which discharges through line 60 and valve 61.

The motor fuel fraction formed by cracking in the presence of a powdered cracking catalyst and blended with approximately 5–50% by volume (approximately 0.05–1.0 molecular proportions) of higher boiling naphthene-containing oil and mixed with approximately 0.2–20 molecular proportions of hydrogen may be heated in heating element 55 at a temperature of the order of 800–1200° F. under a pressure of from substantially atmospheric to approximately 500 pounds per square inch and then conducted through line 62 containing valve 63 to reactor 64 containing a dehydrogenating catalyst composite such as hereinabove described. The normally liquid hydrocarbon mixture introduced to heating element 55 may be charged at an hourly rate corresponding to approximately 0.2–20 volumes of liquid hydrocarbons per volume of reactor containing a dehydrogenating catalyst. Such a charging rate is commonly referred to as a liquid space velocity of 0.2–20. The ratio of the molecular proportions of hydrocarbons being treated to added hydrogen or hydrogen-containing gas such as that formed in the process may be varied within the approximate limits indicated depending upon the nature of the charge, the activity of the catalyst, the conditions of operation, and other factors.

Although the temperatures utilizable for treatment of mixtures of cracked motor fuel and a hydrogen-containing gas in the presence of a dehydrogenating catalyst are approximately 800–1200° F., temperatures most generally applicable are within the approximate range of 900–1100° F. During the relatively short times of contact employed in the present process, a relatively small amount of cracking or refining action takes place upon the cracked gasoline vapors when merely heated at the temperatures and pressure indicated but in the absence of a higher boiling naphthene-containing oil, a hydrogen-containing gas, and a dehydrogenating catalyst. However, in the presence of a dehydrogenating catalyst and under the conditions hereinabove set forth, a definite improvement has been noted in the direction of increased antiknock value and decreased olefin, gum, and sulfur contents of cracked gasolines so treated.

The products formed in reactor 64 may be conducted therefrom through line 65 and valve 66 to fractionator 67 which may comprise a suitable distilling column for separating a mixture of gases and a substantially saturated motor fuel from a higher boiling insufficiently converted fraction. Said mixture of gases and motor fuel may be conducted from fractionator 67 through line 68, valve 69, condenser 70, run-down line 71, and valve 72 to receiver 73 provided with conventional gas release line 74 containing valve 75 and with liquid draw-off line 76 containing valve 77 through which substantially saturated gasoline formed in the process may be conducted to storage or elsewhere as desired. Hydrocarbons boiling higher than motor fuel may be withdrawn from fractionator 67 through line 78 and valve 79 to cooling, not shown, and thence to storage, or all or a part of the material being discharged through line 78 may be directed through line 80 and valve 81 to line 30, already mentioned, through which cracked products boiling higher than gasoline are recycled to further conversion in the presence of a powdered cracking catalyst as hereinabove set forth. Gaseous products collected in receiver 73 and containing a substantial proportion of hydrogen may be withdrawn through line 82 and valve 83 to compresser 84 which discharges through line 85 and valve 86 to line 80 or all or a part of said gaseous products may be directed to line 52 by means not shown in the diagrammatic drawing.

There is substantially no overall consumption of hydrogen in producing a substantially saturated motor fuel from a hydrocarbon oil by the combination process of the present invention. Hydrogen contained in the gases formed during catalytic cracking in the presence of a powdered cracking catalyst as well as produced by dehydrogenation of naphthenes in the presence of a dehydrogenating catalyst, in the second stage of the process, is utilizable for converting into saturated hydrocarbons substantially all of the unsaturated compounds formed in the cracking step of the process. Thus the motor fuel formed generally contains relatively high proportions of isoparaffinic and aromatic hydrocarbons, part of which aromatics may be produced by dehydrocyclization of paraffinic and olefinic materials present in the charge or formed therefrom during cracking.

The following example of one specific operation of the process will serve to illustrate satisfactory operating conditions as applied to specific catalyst but should not be considered as a limitation of the generally broad scope of the invention:

A Pennsylvania gas oil of approximately 36° A. P. I. gravity, 0.5% by weight of a powdered silica-alumina cracking catalyst, and approximately 8 molecular proportions of a hydrogen-containing gas formed in the process may be contacted at approximately 800° F. under a pressure of approximately 50 pounds per square inch to form in a single pass approximately 28% by volume of a 400° F. end-point gasoline having an octane number of 78 and containing approximately 5–10% by volume of olefinic hydrocarbons.

The 400° F. end-point fraction of catalytically cracked gasoline may be blended with an equal volume of a California naphtha with 320–430° F. boiling range, 48 octane number, and 67% naphthene content. Subjection of the resulting hydrocarbon blend to contact with a composite of 8% by weight of chromium sesquioxide and 92% by weight of alumina at 980° F. under a pressure of 300 pounds per square inch in the presence of a hydrogen-containing gas may give a substantially saturated gasoline in a yield equivalent to approximately 88% by volume of the blend charged. The reformed 400° F. end-point gasoline may be approximately 1.2 times the volume of the original 400° F. end-point gasoline fraction contained in the blend charged. Treatment of the catalytically cracked gasoline with hydrogen and a naphthenic oil of higher boiling range may thus produce a substantially saturated motor fuel fraction with relatively high octane number which may be increased further by moderate additions of lead tetraethyl. No appreciable quantity of hydrogen may be consumed in the reforming treatment as the naphthenes undergoing simultaneous dehydrogenation may provide hydrogen sufficient for converting olefinic hydrocarbons into paraffinic hydrocarbons, largely of branched chain structure.

The character of the invention and the type of results obtainable by its use in practice are evident from the preceding specification and example given, although they are not to be considered as imposing undue limitations upon its generally broad scope.

We claim as our invention:

1. A process for producing a substantially saturated gasoline of high octane number which comprises cracking a hydrocarbon oil in the presence of a powdered cracking catalyst and of a hydrogen-containing gas at a temperature and pressure adequate to form a product containing a substantial proportion of gasoline; separating the conversion products into a hydrogen-containing gas, a gasoline fraction containing substantial amounts of unsaturated hydrocarbons, and a higher boiling fraction; returning a portion of said higher boiling fraction to the cracking step; combining said gasoline fraction with a hydrogen-containing gas and a naphthenic oil subjecting the mixture to contact with a dehydrogenating catalyst under conditions of temperature pressure and time adequate to form a substantially saturated gasoline; separating resultant conversion products into a hydrogen-containing gas, a substantially saturated gasoline fraction, and a higher boiling residue; and supplying said hydrogen-containing gas and said higher boiling residue to the first mentioned conversion step.

2. A process for producing a substantially saturated gasoline of high octane number which comprises cracking a hydrocarbon oil in the presence of a powdered cracking catalyst and of a hydrogen-containing gas at a temperature between about 800 and about 1200° F. to form a product containing a substantial proportion of gasoline; separating the conversion products into a hydrogen-containing gas, a gasoline fraction containing substantial amounts of unsaturated hydrocarbons, and a higher boiling fraction; returning a portion of said higher boiling fraction to the cracking step; combining said gasoline fraction with a hydrogen-containing gas and a naphthenic oil boiling above about 200° F.; subjecting the mixture to contact with a dehydrogenating catalyst under conditions of temperature pressure and time adequate to form a substantially saturated gasoline; separating resultant conversion products into a hydrogen-containing gas, a substantially saturated gasoline fraction, and a higher boiling residue; and supplying said hydrogen-containing gas and said higher boiling residue to the first mentioned conversion step.

3. A process for producing a substantially saturated gasoline of high octane number which comprises cracking a hydrocarbon oil in the presence of a powdered silica-alumina cracking catalyst and of a hydrogen-containing gas at a temperature between about 800 and about 1200° F. under a pressure of from substantially atmospheric to approximately 300 pounds per square inch to form a product containing a substantial proportion of motor fuel; separating said product into a hydrogen-containing gas, a motor fuel containing substantial amounts of unsaturated hydrocarbons, and a higher boiling fraction; recycling a portion of said higher boiling fraction to further contact with said powdered cracking catalyst in the presence of said hydrogen-containing gas; mixing said motor fuel and a hydrogen-containing gaseous product of the process with an added naphthenic oil boiling above about 200° F. to form a commingled mixture; subjecting said commingled mixture at a temperature between about 800 and about 1200° F. under a pressure of from substantially atmospheric to approximately 500 pounds per square inch to contact with a dehydrogenating catalyst composite comprising essentially a major proportion of a refractory carrier and a relatively smaller proportion of an oxide of an element selected from the members of the left-hand column of group IV of the periodic table to form a motor fuel-containing product; separating said product into a hydrogen-containing gas, a substantially saturated gasoline fraction, and a higher boiling residue; and recycling said hydrogen-containing gas and said higher boiling residue to commingle with the higher boiling fraction of the product from catalytic cracking being recycled to further contact with the mixture of charged oil and fresh cracking catalyst.

4. A process for producing a substantially saturated gasoline of high octane number which comprises cracking a hydrocarbon oil in the presence of a powdered silica-alumina cracking catalyst and of a hydrogen-containing gas at a temperature between about 800 and about 1200° F. under a pressure of from substantially atmospheric to approximately 300 pounds per square inch to form a product containing a substantial proportion of motor fuel; separating said product into a hydrogen-containing gas, a motor fuel containing substantial amounts of unsaturated hydrocarbons, and a higher boiling fraction; recycling a portion of said higher boiling fraction to further contact with said powdered cracking catalyst in the presence of said hydrogen-containing gas; mixing said motor fuel and a hydrogen-containing gaseous product of the process with an added naphthenic oil boiling above about 200° F. to form a commingled mixture; subjecting said commingled mixture at a temperature between about 800 and about 1200° F. under a pressure of from substantially atmospheric to approximately 500 pounds per square inch to contact with a dehydrogenating catalyst composite comprising essentially a major proportion of a refractory carrier and a relatively smaller proportion of an oxide of an element selected from the members of the left-hand column of group V of the periodic table to form a motor fuel-containing product; separating said product into a hydrogen-containing gas, a substantially saturated gasoline fraction, and a higher boiling residue; and recycling said hydrogen-containing gas and said higher boiling residue to commingle with the higher boiling fraction of the product from catalytic cracking being recycled to further contact with the mixture of charged oil and fresh cracking catalyst.

5. A process for producing a substantially saturated gasoline of high octane number which comprises cracking a hydrocarbon oil in the presence of a powdered silica-alumina cracking catalyst and of a hydrogen-containing gas at a temperature between about 800 and about 1200° F. under a pressure of from substantially atmospheric to approximately 300 pounds per square inch to form a product containing a substantial proportion of motor fuel; separating said product into a hydrogen-containing gas, a motor fuel containing substantial amounts of unsaturated hydrocarbons, and a higher boiling fraction; recycling a portion of said higher boiling fraction to further contact with said powdered cracking catalyst in the presence of said hydrogen-containing gas; mixing said motor fuel and a hydrogen-containing gaseous product of the process with an added naphthenic oil boiling above about 200° F. to form a commingled mixture; subjecting said commingled mixture at a temperature between about 800 and about 1200° F. under a pressure of from substantially atmospheric to approximately 500 pounds per square inch to contact with a dehydrogenating catalyst composite comprising essentially a major proportion of a refractory carrier and a relatively smaller proportion of an oxide of an element selected from the members of the left-hand column of group VI of the periodic table to form a substantially saturated gasoline fraction, and a higher boiling residue; and recycling said hydrogen-containing gas and said hihger boiling residue to commingle with the higher boiling fraction of the product from catalytic cracking being recycled to further contact with the mixture of charged oil and fresh cracking catalyst.

6. A process for producing a substantially saturated gasoline of high octane number which comprises cracking a hydrocarbon oil in the presence of a powdered silica-alumina cracking catalyst at a temperature between about 800 and about 1200° F. under a pressure of from substantially atmospheric to approximately 300 pounds per square inch to form a product containing a substantial proportion of motor fuel; separating said product into a hydrogen-containing gas, a motor fuel containing substantial amounts of unsaturated hydrocarbons, and a higher boiling fraction; recycling a portion of said higher boiling fraction to further contact with said powdered cracking catalyst; mixing said motor fuel and a hydrogen-containing gaseous product of the process with an added naphthenic oil boiling above about 200° F. to form a commingled mixture; subjecting said commingled mixture at a temperature between about 800 and about 1200° F. under a pressure of from substantially atmospheric to approximately 500 pounds per square inch to contact with a dehydrogenating catalyst composite comprising essentially a major proportion of a refractory carrier and a relatively smaller proportion of an oxide of an element selected from the members of the left-hand column of group VI of the periodic table to form a substantially saturated gasoline fraction, and a higher boiling residue; recycling said higher boiling residue to commingle with the higher boiling fraction of the product from catalytic cracking being recycled to further contact with the mixture of charged oil and fresh cracking catalyst; and recycling said hydrogen-containing gas to commingle with said motor fuel and added naphthenic oil being contacted with said dehydrogenating catalyst.

7. A process for producing a substantially saturated gasoline of high octane number which comprises cracking a hydrocarbon oil in the presence of a powdered silica-alumina cracking catalyst at a temperature between about 800 and about 1200° F. under a pressure of from substantially atmospheric to approximately 300 pounds per square inch to form a product containing a substantial proportion of motor fuel; separating said product into a hydrogen-containing gas, a motor fuel containing substantial amounts of unsaturated hydrocarbons, and a higher boiling fraction; recycling a portion of said higher boiling fraction to further contact with said powdered cracking catalyst; mixing said motor fuel with an added naphthenic oil boiling above about 200° F. to form a commingled mixture; subjecting said commingled mixture at a temperature between about 800 and about 1200° F. under a pressure of from substantially atmospheric to approximately 500 pounds per square inch to contact with a dehydrogenating catalyst composite comprising essentially a major proportion of a refractory carrier and a relatively smaller proportion of an oxide of an element selected from the members of the left-hand column of group VI of the periodic table to form a substantially saturated gasoline fraction, and a higher boiling residue; and recycling said higher boiling residue to commingle with the higher boiling fraction of the product from catalytic cracking being recycled to further contact with the mixture of charged oil and fresh cracking catalyst.

8. The process of claim 1 further characterized in that the hydrogen-containing gas combined with the gasoline fraction comprises hydrogen-containing gas separated in the first mentioned separating step.

9. The process of claim 1 further characterized in that the hydrogen-containing gas combined with the gasoline fraction comprises hydrogen-containing gas separated in the second mentioned separating step.

BERNARD S. FRIEDMAN.
WAYNE L. BENEDICT.